(12) United States Patent
Sugiyama

(10) Patent No.: US 9,061,596 B2
(45) Date of Patent: Jun. 23, 2015

(54) CHARGING DEVICE AND CHARGING METHOD FOR POWER STORAGE DEVICE

(75) Inventor: Yoshinobu Sugiyama, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 13/498,483

(22) PCT Filed: Aug. 30, 2010

(86) PCT No.: PCT/JP2010/064685
§ 371 (c)(1),
(2), (4) Date: Mar. 27, 2012

(87) PCT Pub. No.: WO2012/029101
PCT Pub. Date: Mar. 8, 2012

(65) Prior Publication Data
US 2013/0193917 A1    Aug. 1, 2013

(51) Int. Cl.
*H02J 7/00* (2006.01)
*B60L 11/18* (2006.01)
(Continued)

(52) U.S. Cl.
CPC ............. *B60L 11/1811* (2013.01); *B60L 3/003* (2013.01); *B60L 11/123* (2013.01); *B60L 11/14* (2013.01); *B60L 11/1816* (2013.01); *B60L 11/185* (2013.01); *B60L 11/1862* (2013.01); *B60L 2210/30* (2013.01); *B60L 2210/40* (2013.01); *B60L 2220/14* (2013.01); *Y02T 10/7005* (2013.01); *Y02T 90/121* (2013.01);
(Continued)

(58) Field of Classification Search
CPC ... Y02T 10/7005; Y02T 90/14; Y02T 90/128; B60W 10/06

USPC .................. 320/109, 137, 162, 104; 191/2–5
See application file for complete search history.

(56) References Cited

U.S. PATENT DOCUMENTS 7,221,064 B2 * 5/2007 Okuda et al. ................. 307/10.1
7,573,238 B2 * 8/2009 Kawai .......................... 320/132
(Continued)

FOREIGN PATENT DOCUMENTS

CN    101687507 A    3/2010
JP    A-04-058785    2/1992
(Continued)

OTHER PUBLICATIONS

International Search Report issued in International Application No. PCT/JP2010/064685 dated Oct. 26, 2010 (with translation).

*Primary Examiner* — Richard Isla Rodas
*Assistant Examiner* — Michael DiBenedetto
(74) *Attorney, Agent, or Firm* — Oliff PLC

(57) ABSTRACT

A charger includes a conversion unit for converting external electric power from a charging port into DC, a conversion unit for converting the output of the preceding conversion unit into high-frequency AC, and a conversion unit for converting the electric power generated by transforming the output of the preceding conversion unit by an insulated transformer into DC to output the DC to a power storage device. The charger further includes a switch unit that enables the circuit configuration of the charger to switch between a single-stage charging circuit and a dual-stage charging circuit. The switch unit is controlled by a control signal from an ECU. The ECU controls the switch unit in accordance with the SOC of the power storage device and switches the circuit configuration of the charger to one of the single-stage charging circuit and the dual-stage charging circuit.

8 Claims, 6 Drawing Sheets

(51) Int. Cl.
*B60L 3/00* (2006.01)
*B60L 11/12* (2006.01)
*B60L 11/14* (2006.01)
*B60L 11/00* (2006.01)

(52) U.S. Cl.
CPC ............ *Y02T 90/127* (2013.01); *Y02T 90/128* (2013.01); *Y02T 90/14* (2013.01); *Y02T 10/7077* (2013.01); *Y02T 10/7044* (2013.01); *Y02T 10/705* (2013.01); *Y02T 10/7241* (2013.01); *Y02T 10/7022* (2013.01); *H02J 7/0052* (2013.01); *B60L 11/005* (2013.01); *Y02T 10/6217* (2013.01)

(56) References Cited

U.S. PATENT DOCUMENTS

| | | | | |
|---|---|---|---|---|
| 8,030,882 | B2* | 10/2011 | Ito et al. | 320/104 |
| 8,030,884 | B2* | 10/2011 | King et al. | 320/104 |
| 8,143,856 | B2* | 3/2012 | Andrea et al. | 320/128 |
| 8,441,228 | B2* | 5/2013 | Brabec | 320/104 |
| 2002/0008496 | A1* | 1/2002 | Shamoto et al. | 320/116 |
| 2008/0036419 | A1* | 2/2008 | Cook et al. | 320/104 |
| 2009/0301801 | A1* | 12/2009 | Fujitake | 180/65.29 |
| 2010/0134065 | A1* | 6/2010 | Iida | 320/103 |
| 2010/0145560 | A1 | 6/2010 | Komatsu et al. | |
| 2010/0318252 | A1* | 12/2010 | Izumi | 701/22 |
| 2011/0309793 | A1* | 12/2011 | Mitsutani | 320/109 |
| 2012/0019212 | A1* | 1/2012 | Krauer | 320/137 |
| 2012/0091957 | A1* | 4/2012 | Masuda | 320/109 |

FOREIGN PATENT DOCUMENTS

| | | |
|---|---|---|
| JP | A-08-107607 | 4/1996 |
| JP | A-2001-119954 | 4/2001 |
| JP | A-2009-274479 | 11/2009 |

* cited by examiner

CHARGING DEVICE AND CHARGING METHOD FOR POWER STORAGE DEVICE

TECHNICAL FIELD

The present invention relates to a technique of charging a power storage device mounted on a vehicle with electric power fed from a power supply which is external to the vehicle.

BACKGROUND ART

Recently, there have been known vehicles that are each capable of using electric power fed from a power supply which is external to the vehicle (hereinafter also referred to as "external power") to charge a power storage device mounted on the vehicle (hereinafter also referred to as "external charging"). Such vehicles are also called plug-in vehicles and usually equipped with a charger for converting an externally fed AC (alternating current) into a DC (direct current) to output the DC to the power storage device. A circuit configuration of such a charger is disclosed for example in PTL 1 (Japanese Patent Laying-Open No. 8-107607).

The charger disclosed in PTL 1 is provided with a power converter including an inverter circuit, a switching bridge, and a diode bridge. The charger converts an AC that is input from the outside of the vehicle into a DC by means of a switching operation of the power converter while adjusting the power factor, and converts the DC which is input from the power converter into a high-frequency AC by means of a switching operation of the switching bridge and thereafter converts the AC back to a DC by means of the diode bridge to output the resultant DC to a battery. This charging mode is carried out in two steps (two stages), namely the power factor adjustment and the conversion to the high frequency AC, which involve the switching operations, and therefore also called dual-stage charging.

CITATION LIST

Patent Literature

PTL 1: Japanese Patent Laying-Open No. 8-107607
PTL 2: Japanese Patent Laying-Open No. 2009-274479

SUMMARY OF INVENTION

Technical Problem

The external charging mode includes, besides the above-described dual-stage charging, an external charging mode called single-stage charging. Specifically, in a single stage, both of the power factor adjustment and the conversion to a high-frequency AC that involve the switching operations are carried out.

The single-stage charging, as compared with the dual-stage charging, is characterized by a smaller switching loss and a higher efficiency, while also characterized by a larger extent of variation of the output current which results in a lower precision in determining whether to end charging. In contrast, charging by means of the dual-stage charging is characterized by a relatively lower efficiency while characterized by a relatively smaller extent of variation of the output current and accordingly a relatively higher precision in determining whether to end charging.

As disclosed in PTL 1, employment of a circuit adapted to the dual-stage charging as a circuit configuration of a charger is accompanied by a problem of a lower charging efficiency as compared with the case where a circuit adapted to the single-stage charging is employed.

The present invention has been made to solve the above-described problem, and an object of the invention is to perform charging in consideration of the charging efficiency, when a power storage device mounted on a vehicle is to be charged with electric power fed from a power supply which is external to the vehicle.

Solution to Problem

The charging device according to the present invention is a charging device for a power storage device mounted on a vehicle, including a power receiving unit receiving electric power supplied from a power supply which is external to the vehicle, and a charger converting electric power which is input from the power receiving unit and outputting the converted electric power to the power storage device. The charger includes: a first conversion unit having a first switching circuit; a second conversion unit connected to the first conversion unit and having a second switching circuit; and a switch unit for switching a circuit configuration of the charger to one of a first charging circuit for performing first charging by operating the second switching circuit without operating the first switching circuit, and a second charging circuit for performing second charging by operating both the first switching circuit and the second switching circuit.

Preferably, the charging device further includes a control device controlling the charger. The control device switches the circuit configuration of the charger to one of the first charging circuit and the second charging circuit, based on an amount of charge stored in the power storage device.

Preferably, when the amount of charge is smaller than a threshold value, the control device controls the switch unit so that the first charging circuit is formed, and controls the first switching circuit and the second switching circuit so that the first charging is performed and, when the amount of charge is larger than the threshold value, the control device controls the switch unit so that the second charging circuit is formed, and controls the first switching circuit and the second switching circuit so that the second charging is performed.

Preferably, the threshold value is set to a value smaller by a predetermined value than a target value of the amount of charge when charging is performed.

Preferably, the control device calculates the amount of charge based on a voltage across the power storage device during the second charging, and determines whether the calculated amount of charge has reached the target value.

Preferably, the charger includes a positive line and a negative line for supplying electric power converted by the first conversion unit to the second conversion unit. The switch unit includes a capacitor switch unit switched to a state of connecting a capacitor between the positive line and the negative line when the second charging circuit is formed, and switched to a state of not connecting the capacitor between the positive line and the negative line when the first charging circuit is formed.

Preferably, the switch unit includes: a first reactor switch unit switched to a state of connecting a first reactor circuit between the power receiving unit and the first conversion unit when the second charging circuit is formed, and switched to a state of not connecting the first reactor circuit between the power receiving unit and the first conversion unit when the first charging circuit is formed; and a second reactor switch unit switched to a state of connecting a second reactor circuit between the first conversion unit and the second conversion unit when the first charging circuit is formed, and switched to a state of not connecting the second reactor circuit between the first conversion unit and the second conversion unit when the second charging circuit is formed.

The charging method according to another aspect of the present invention is a charging method for a power storage device mounted on a vehicle. The vehicle includes a power receiving unit receiving electric power supplied from a power supply which is external to the vehicle, and a charger converting electric power which is input from the power receiving unit and outputting the converted electric power to the power storage device. The charger includes: a first conversion unit having a first switching circuit; a second conversion unit connected to the first conversion unit and having a second switching circuit; and a switch unit for switching a circuit configuration of the charger to one of a first charging circuit for performing first charging by operating the second switching circuit without operating the first switching circuit, and a second charging circuit for performing second charging by operating both the first switching circuit and the second switching circuit. The charging method includes the steps of determining whether to start external charging which charges the power storage device with electric power of the power supply, and controlling the charger in a case of starting the external charging. The step of controlling the charger includes the step of switching the circuit configuration of the charger to one of the first charging circuit and the second charging circuit, based on an amount of charge stored in the power storage device.

Preferably, the step of controlling the charger includes the steps of: when the amount of charge is smaller than a threshold value, controlling the switch unit so that the first charging circuit is formed, and controlling the first switching circuit and the second switching circuit so that the first charging is performed; and when the amount of charge is larger than the threshold value, controlling the switch unit so that the second charging circuit is formed, and controlling the first switching circuit and the second switching circuit so that the second charging is performed.

Preferably, the threshold value is set to a value smaller by a predetermined value than a target value of the amount of charge when charging is performed.

Preferably, the charging method further includes the step of calculating the amount of charge based on a voltage across the power storage device during the second charging, and determining whether the calculated amount of charge has reached the target value.

Advantageous Effects of Invention

In accordance with the present invention, in the case of charging a power storage device mounted on a vehicle with electric power supplied from a power supply located externally to the vehicle, charging can be carried out taking the charging efficiency into consideration.

DESCRIPTION OF EMBODIMENTS

Figure 1:
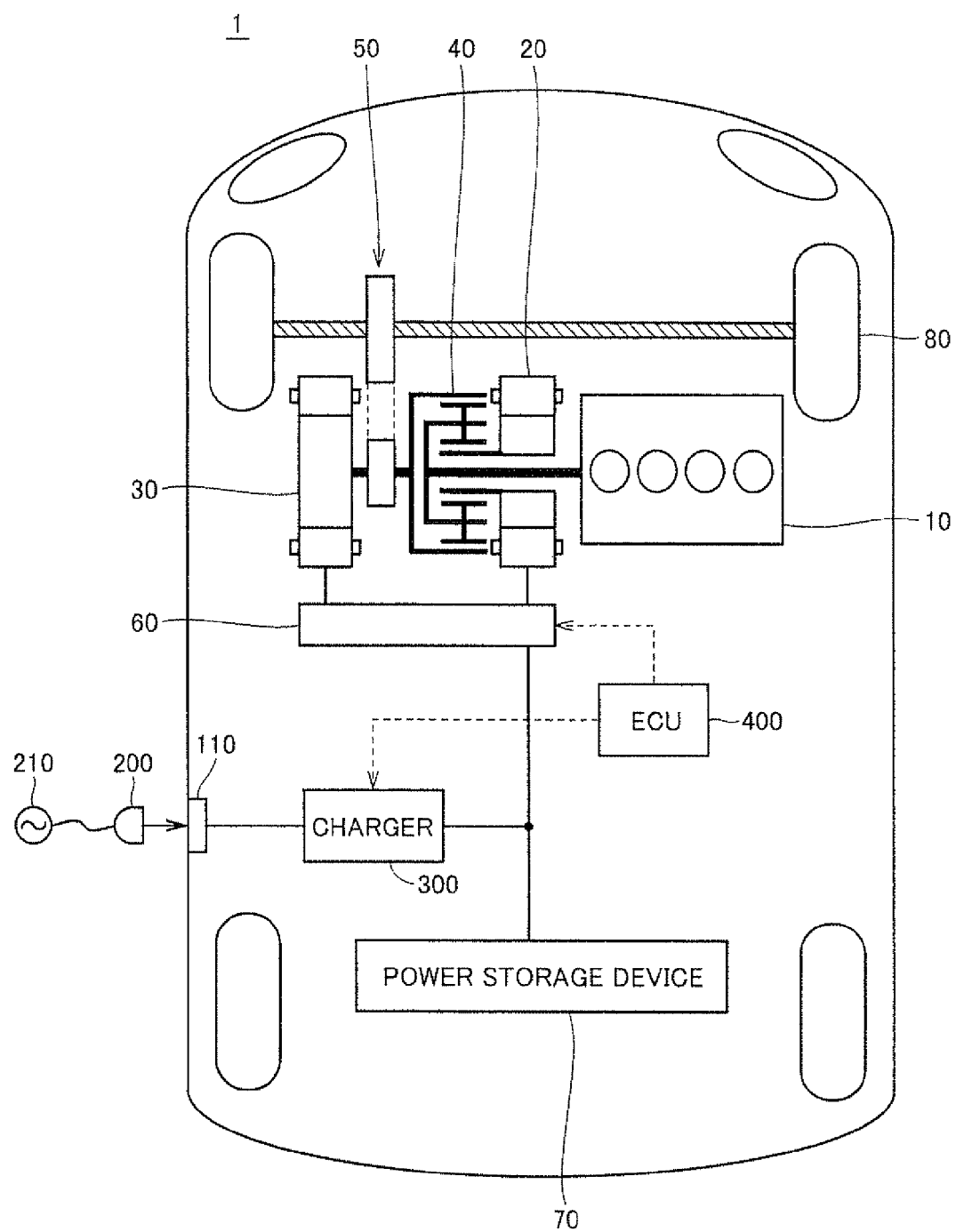
FIG. 1 is an entire block diagram of a vehicle.

An embodiment of the present invention will hereinafter be described in detail with reference to the drawings. In the drawings, the identical or corresponding components are denoted by the identical reference characters, and a description thereof will not be repeated.

FIG. 1 is an entire block diagram of a vehicle 1 according to the embodiment of the present invention. Vehicle 1 is a so-called plug-in hybrid vehicle. Referring to FIG. 1, this vehicle 1 includes an engine 10, a first MG (Motor Generator) 20, a second MG 30, a power split device 40, a reducer 50, a motor drive device 60, a power storage device 70, and drive wheels 80. Vehicle 1 further includes a charging port 110, a charger 300, and an ECU (Electronic Control Unit) 400.

Engine 10, first MG 20, and second MG 30 are coupled to power split device 40. This vehicle 1 travels using a drive force which is output from at least one of engine 10 and second MG 30. Motive power generated by engine 10 is split by power split device 40 into two distribution paths. Specifically, one is a path through which the power is transmitted via reducer 50 to drive wheels 80, and the other is a path through which the power is transmitted to first MG 20.

First MG 20 and second MG 30 are each an AC electric motor which is for example a three-phase AC synchronous electric motor. First MG 20 and second MG 30 are driven by motor drive device 60. First MG 20 generates electric power using the motive power of engine 10 which has been split by power split device 40. The electric power generated by first MG 20 is converted by motor drive device 60 from AC to DC and stored in power storage device 70.

Second MG 30 generates a drive force using at least one of the electric power stored in power storage device 70 and the electric power generated by first MG 20. The drive force of second MG 30 is then transmitted via reducer 50 to drive wheels 80. While FIG. 1 shows drive wheels 80 as front wheels, the rear wheels may be driven by second MG 30 instead of the front wheels or together with the front wheels.

At the time for example when the vehicle is braked, second MG 30 is driven by drive wheels 80 via reducer 50, and second MG 30 operates as an electric generator. Thus, second MG 30 also functions as a regenerative brake converting the kinetic energy of the vehicle into electric power. The electric power generated by second MG 30 is stored in power storage device 70.

Power split device 40 is formed of a planetary gear train including a sun gear, a pinion gear, a carrier, and a ring gear. The pinion gear meshes with the sun gear and the ring gear. The carrier supports the pinion gear in such a manner that enables the pinion gear to rotate about its axis, and is coupled to a crankshaft of engine 10. The sun gear is coupled to the rotational shaft of first MG 20. The ring gear is coupled to the rotational shaft of second MG 30 and to reducer 50.

Motor drive device 60 receives electric power from power storage device 70, and drives first MG 20 and second MG 30 based on a control signal from ECU 400. Motor drive device 60 also converts AC power generated by first MG 20 and/or second MG 30 into DC power based on a control signal from ECU 400, and outputs the DC power to power storage device 70.

Power storage device 70 is a rechargeable DC power supply and is fanned of a secondary battery such as nickel-metal hydride or lithium ion secondary battery for example. The voltage of power storage device 70 is approximately 200 V for example. In power storage device 70, the electric power generated by first MG 20 and second MG 30 as well as the electric power supplied from external power supply 210 as described later herein are stored. As power storage device 70, a high capacity capacitor may also be used.

Charging port 110 is an electric power interface for receiving electric power from external power supply 210. When power storage device 70 is charged from external power supply 210, a connector 200 of a charging cable used for supplying electric power of external power supply 210 (this electric power is hereinafter referred to as "external power") to the vehicle is connected to charging port 110.

Charger 300 is electrically connected to charging port 110 and to power storage device 70. Based on a control signal from ECU 400, charger 300 converts the external power into electric power with which power storage device 70 can be charged, and outputs the converted electric power to power storage device 70. In this way, power storage device 70 is charged with the external power (hereinafter referred to as "external charging").

ECU 400 generates control signals for driving motor drive device 60 and charger 300, and outputs the generated control signals to motor drive device 60 and charger 300.

Figure 2:
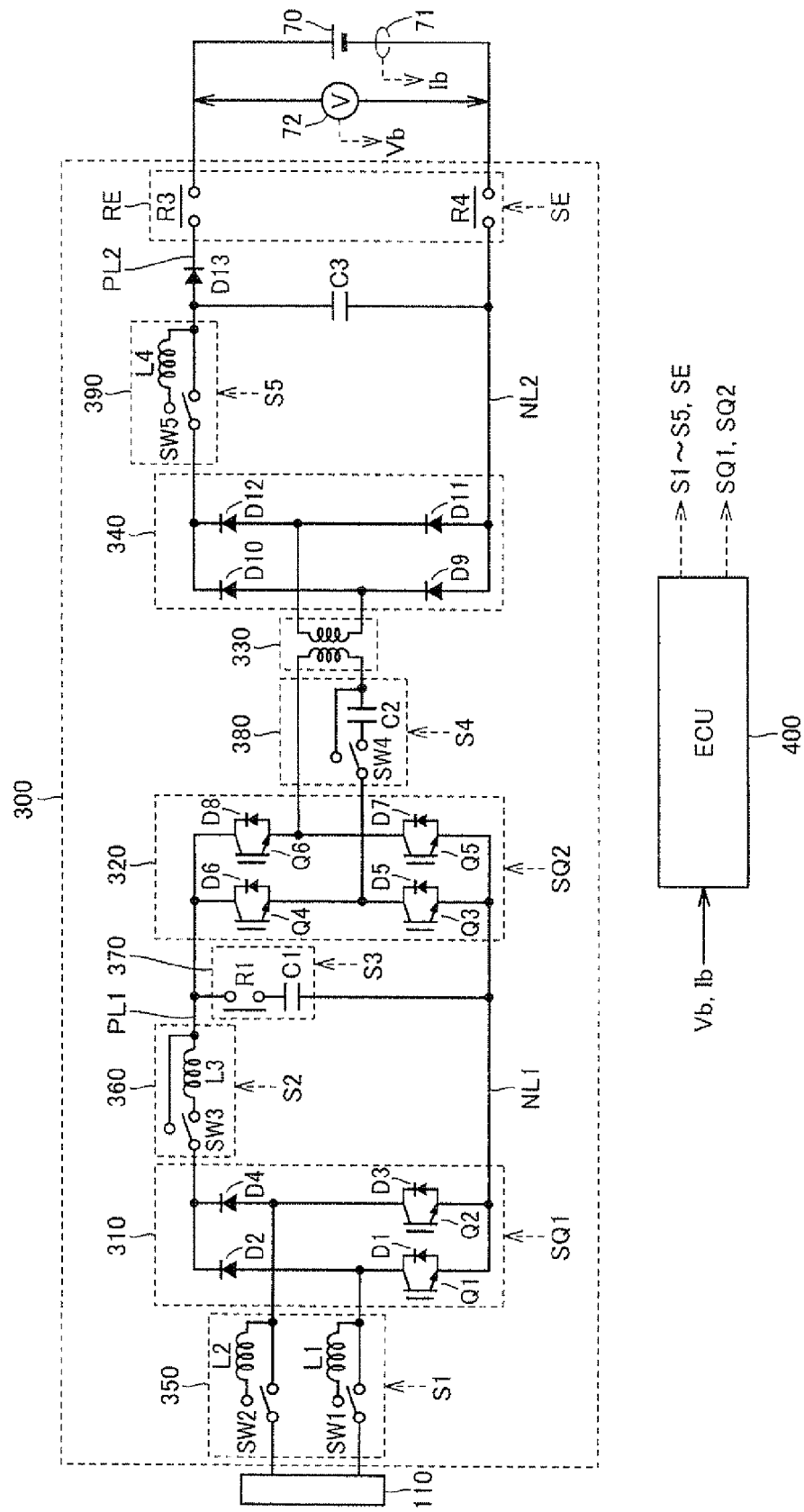
FIG. 2 is a detailed configuration diagram of a charger.

FIG. 2 is a detailed configuration diagram of charger 300 shown in FIG. 1. Charger 300 includes conversion units 310, 320, 340, an insulated transformer 330, and a relay RE. These circuits are connected in series between charging port 110 and power storage device 70. Accordingly, the external power from charging port 110 is input to conversion unit 310, the output of conversion unit 310 is input to conversion unit 320, the output of conversion unit 320 is input via insulated transformer 330 to conversion unit 340, and the output of conversion unit 340 is input via relay RE to power storage device 70.

Conversion unit 310 includes diodes D1 to D4 and switching elements Q1, Q2. Diode D1 and diode D2 are connected in series and provided between a positive line PL1 and a negative line NL1. Diode D3 and diode D4 are connected in series and provided between positive line PL1 and negative line NL1. Diodes D1 to D4 each have the forward direction defined as the direction from negative line NL1 toward positive line PL1. To diodes D1, D3, switching elements Q1, Q2 are connected in parallel, respectively. The switching operation (ON and OFF operation) of switching elements Q1, Q2 each is controlled by a control signal SQ1 from ECU 400.

Conversion unit 310 rectifies (converts) the external power (AC power) which is input from charging port 110 into DC power and outputs the DC power to conversion unit 320.

Conversion unit 320 includes diodes D5 to D8 and switching elements Q3 to Q6. Diode D5 and diode D6 are connected in series and provided between positive line PL1 and negative line NL1. Diode D7 and diode D8 are connected in series and provided between positive line PL1 and negative line NL1. Diodes D5 to D8 each have the forward direction defined as the direction from negative line NL1 toward positive line PL1. To diodes D5 to D8, switching elements Q3 to Q6 are connected in parallel, respectively. The switching operation of switching elements Q3 to Q6 each is controlled by a control signal SQ2 from ECU 400.

Conversion unit 320 converts the DC power which is input from conversion unit 310 into high-frequency AC power and outputs the AC power to insulated transformer 330.

Insulated transformer 330 is made up of a core of a magnetic material and a primary coil and a secondary coil wound around the core. The primary coil and the secondary coil are connected to conversion units 320, 340 respectively, and electrically insulated from each other. Insulated transformer 330 converts a voltage of the AC power which is received from conversion unit 320 into a voltage level in accordance with the turn ratio between the primary coil and the secondary coil, and outputs the resultant voltage level to conversion unit 340.

Conversion unit 340 includes diodes D9 to D12. Diode D9 and diode D10 are connected in series and provided between a positive line PL2 and a negative line NL2. Diode D11 and diode D12 are connected in series and provided between positive line PL2 and negative line NL2. Diodes D9 to D12 each have the forward direction defined as the direction from negative line NL2 toward positive line PL2.

Conversion unit 340 rectifies (converts) the AC power which is input from insulated transformer 330 into DC power and outputs the DC power to power storage device 70. Thus, power storage device 70 is charged with the external power. On positive line PL2, a diode D13 having the forward direction defined as the direction from conversion unit 340 toward the positive electrode of power storage device 70 is provided. Between positive line PL2 and negative line NL2, a capacitor C3 is provided.

Relay RE is provided between conversion unit 340 and power storage device 70, and is rendered ON and OFF based on a control signal SE from ECU 400. When external charging is performed, relay RE is controlled so that the relay is in the ON state.

A current Ib flowing through power storage device 70 and a voltage Vb across power storage device 70 are detected respectively by a current sensor 71 and a voltage sensor 72. The results of detection of current Ib and voltage Vb are input to ECU 400.

Charger 300 further includes switch units 350, 360, 370, 380, 390.

Switch unit 350 is provided between charging port 110 and conversion unit 310. Switch unit 350 is configured to include switches SW1, SW2 and reactors (coils) L1, L2. Switches SW1, SW2 are controlled by a control signal S1 from ECU 400 to thereby control switch unit 350 so that the switch unit is in one of a first state and a second state. When switch unit 350 is controlled to be set in the first state, charging port 110 and conversion unit 310 are directly connected without reactors L1, L2 therebetween. In contrast, when switch unit 350 is controlled to be set in the second state, charging port 110 and conversion unit 310 are connected via reactors L1, L2. Specifically, reactor L1 is connected between a point located between diodes D1 and D2 and charging port 110, and reactor L2 is connected to a point located between diodes D3 and D4 and charging port 110.

Switch unit 360 is provided on positive line PL1 between conversion unit 310 and conversion unit 320. Switch unit 360 is configured to include a switch SW3 and a reactor L3. Switch SW3 is controlled by a control signal S2 from ECU 400 to thereby control switch unit 360 so that the switch unit is in one of a first state and a second state. When switch unit 360 is controlled to be set in the first state, conversion unit 310 and conversion unit 320 are connected via reactor L3. In contrast, when switch unit 360 is controlled to be set in the second state, conversion unit 310 and conversion unit 320 are directly connected without reactor L3 therebetween.

Switch unit 370 is provided between positive line PL1 and negative line NL1. Switch unit 370 is configured to include a relay R1 and a capacitor C1. Relay R1 is controlled by a control signal S3 from ECU 400 to thereby control switch unit 370 so that the switch unit is in one of a first state and a second state. When switch unit 370 is controlled to be set in the first state (where relay R1 is controlled to be set in the OFF state), capacitor C1 is not connected between positive line PL1 and negative line NL1. In contrast, when switch unit 370 is controlled to be set in the second state (where relay R1 is controlled to be set in the ON state), capacitor C1 is connected between positive line PL1 and negative line NL1.

Switch unit 380 is provided between conversion unit 320 and insulated transformer 330. Switch unit 380 is configured to include a switch SW4 and a capacitor C2. Switch SW4 is controlled by a control signal S4 from ECU 400 to thereby control switch unit 380 so that the switch unit is in one of a first state and a second state. When switch unit 380 is controlled to be set in the first state, capacitor C2 is connected between conversion unit 320 and the primary coil of insulated transformer 330. In contrast, when switch unit 380 is controlled to be set in the second state, capacitor C2 is not connected between conversion unit 320 and the primary coil of insulated transformer 330.

Switch unit 390 is provided on positive line PL2 between conversion unit 340 and diode D13. Switch unit 390 is configured to include a switch SW5 and a reactor L4. Switch SW5 is controlled by a control signal S5 from ECU 400 to thereby control switch unit 390 so that the switch unit is in one of a first state and a second state. When switch unit 390 is controlled to be set in the first state, conversion unit 340 and diode D13 are directly connected without reactor L4 therebetween. In contrast, when switch unit 390 is controlled to be set in the second state, conversion unit 340 and diode D13 are connected via reactor L3.

Charger 300 according to the present embodiment is thus provided with switch units 350, 360, 370, 380, 390 as described above, so that the external charging mode can be switched between a mode of performing external charging by executing a switching operation in conversion unit 320 without executing a switching operation in conversion unit 310 (hereinafter referred to as "single-stage charging") and a mode of performing external charging by executing switching operations in both of conversion unit 310 and conversion unit 320 (hereinafter referred to as "dual-stage charging").

Figure 3:
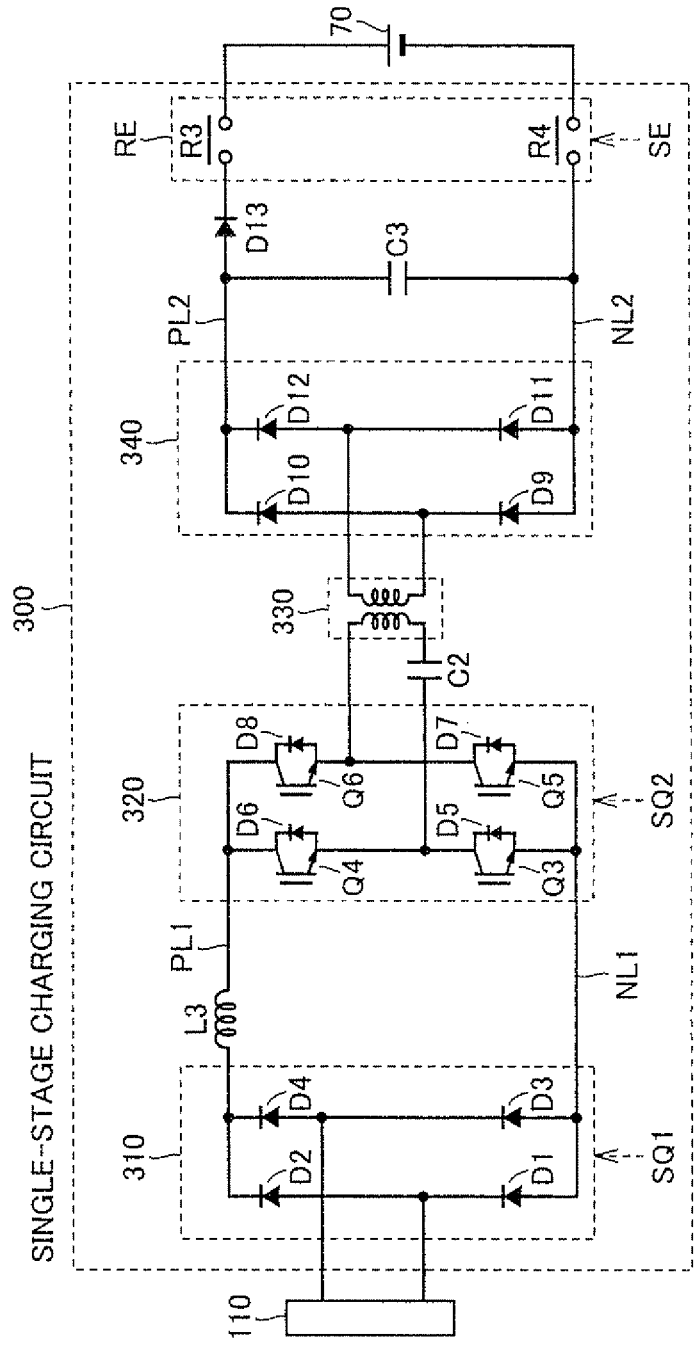
FIG. 3 is a diagram showing a circuit configuration of a charger in the case where the single-stage charging is performed.

FIG. 3 is a diagram showing a circuit configuration of charger 300 in the case where the single-stage charging is performed (hereinafter also referred to as "single-stage charging circuit"). The single-stage charging circuit is formed by setting above-described switch units 350, 360, 370, 380, 390 each in the first state and stopping switching elements Q1, Q2 of conversion unit 310 in the OFF state.

In the single-stage charging circuit, the external power (AC power) which is input to charging port 110 is rectified by conversion unit 310 into DC power which is thereafter input to conversion unit 320 via reactor L3 provided on positive line PL1. A switching operation of conversion unit 320 causes the DC power which is input to conversion unit 320 to be converted into high-frequency AC power, and the input power factor (phase shift of the input current waveform relative to the input voltage waveform) is adjusted. The AC power into which the DC power is converted by conversion unit 320 is input to insulated transformer 330 via capacitor C2. The AC power which is input to insulated transformer 330 is transformed by insulated transformer 330, and thereafter input to conversion unit 340 to be rectified back to DC power, and then output to power storage device 70.

Thus, in the single-stage charging circuit, both of the power factor adjustment and the conversion into the high-frequency AC that involve switching operations are carried out in a single step (single stage) of conversion unit 320.

Figure 4:
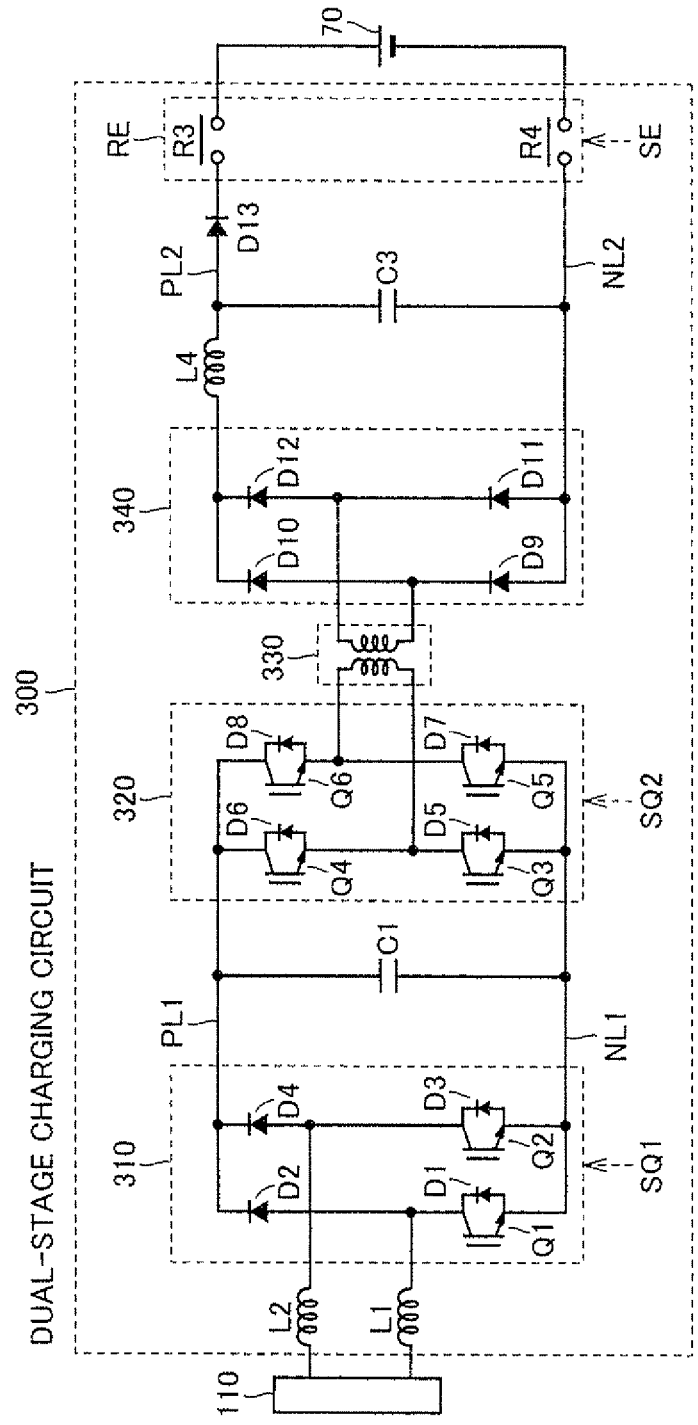
FIG. 4 is a diagram showing a circuit configuration of a charger in the case where the dual-stage charging is performed.

FIG. 4 is a diagram showing a circuit configuration of charger 300 in the case where the dual-stage charging is performed (hereinafter also referred to as "dual-stage charging circuit"). The dual-stage charging circuit is formed by setting above-described switch units 350, 360, 370, 380, 390 each in the second state.

In the dual-stage charging circuit, reactors L1, L2 are provided between charging port 110 and conversion unit 310. The external power which is input to charging port 110 is converted by conversion unit 310 into DC power, and the input power factor is adjusted by a switching operation of conversion unit 310. The DC power into which the input power is converted by conversion unit 310 is input to conversion unit 320 via positive line PL1 and negative line NL1. A variation of the electric power between positive line PL1 and negative line NL1 is smoothed by capacitor C1. The DC power which is input to conversion unit 320 is converted into high-frequency AC power by a switching operation of conversion unit 320. The high-frequency AC power into which the DC power is converted by conversion unit 320 is transformed by insulated transformer 330 and thereafter input to conversion unit 340 to be rectified again to DC power, and thereafter output via reactor L4 to power storage device 70.

Thus, in the dual-stage charging circuit, the power factor adjustment and the conversion to high-frequency AC that involve switching operations are carried out in two steps (two stages) of conversion units 310, 320, respectively. Specifically, the switching operation of conversion unit 310 is used to adjust the power factor, and then the switching operation of conversion unit 320 is used to make a conversion to the high-frequency AC.

From a comparison between the single-stage charging and the dual-stage charging, the following difference is found.

In the case of the single-stage charging, the switching operation is performed in conversion unit 320 only (single stage). In the case of the dual-stage charging, the switching operations are performed in conversion units 310, 320 (two stages). The single-stage charging is therefore smaller in switching operation loss and higher in charging efficiency, relative to the dual-stage charging.

Disadvantageously, however, the single-stage charging circuit lacks capacitor C1 and therefore the single-stage charging is larger in terms of the extent of variation of voltage Vb across power storage device 70 which is being externally charged, relative to the dual-stage charging. One of the reasons for this is a larger ripple amplitude (extent of variation) of current Ib flowing through power storage device 70. More specifically, any of the charging modes involves a switching operation and therefore a ripple component due to the switching operation is included in current Ib. Because of the fact that the single-stage charging circuit is not provided with capacitor C1 which is provided in the dual-stage charging circuit, the ripple amplitude of current Ib of the single-stage charging is larger than the dual-stage charging. Usually, power storage device 70 has an internal resistance, and therefore, a variation of voltage Vb across power storage device 70 increases in response to a variation of current Ib. Thus, a larger ripple amplitude results in a larger extent of variation of voltage Vb. Consequently, the single-stage charging could be accompanied by a deteriorated precision in determining whether to end charging, which is described later herein, as compared with the dual-stage charging.

In other words, while the dual-stage charging has a lower charging efficiency than the single-stage charging, the extent of variation of voltage Vb is smaller in the dual-stage charging and thus the precision in determining whether to end charging, which is described later herein, can be improved.

Thus, charger 300 according to the present embodiment includes switch units 350, 360, 370, 380, 390 that enable a switch between the single-stage charging circuit and the dual-stage charging circuit. ECU 400 controls switch units 350, 360, 370, 380, 390 in accordance with whether or not switching conditions are met, to make a switch between the charging circuits. In the following, a description will be given of the case where a switch is made between the charging circuits in accordance with the state of charge (hereinafter referred to as "SOC") of power storage device 70. In the present embodiment, the SOC is expressed by a ratio (in percent) of the amount of stored energy to the fully charged state of power storage device 70.

Figure 5:
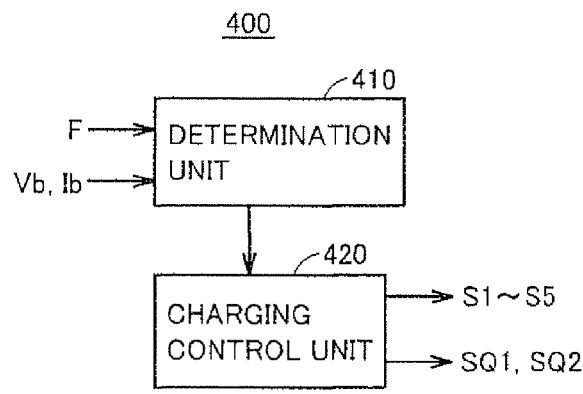
FIG. 5 is a functional block diagram of an ECU.

FIG. 5 is a functional block diagram of ECU 400 when external charging is performed. Each functional block shown in FIG. 5 may be implemented by hardware including electronic circuitry for example or by software including execution of a program for example.

ECU 400 includes a determination unit 410 and a charging control unit 420.

Determination unit 410 first determines whether a charging request flag F is in the ON state or not. Charging request flag F is a parameter which is switched from the OFF state to the ON state when a user connects connector 200 to charging port 110 or when a charging start time which is set in advance by means of a timer or the like is reached, for example.

When charging request flag F is in the ON state, determination unit 410 calculates the SOC corresponding to a detected value of voltage Vb (output value of voltage sensor 72) using a Vb-SOC map (not shown) by which a correlation between voltage Vb and the SOC is stored in advance, and determines whether or not the calculated SOC is larger than a threshold value SOC1.

Here, threshold value SOC1 is set to a slightly lower value (by approximately a few percent for example) than a target value of the SOC to be reached when external charging is ended (hereinafter referred to as "target charging value SOCtag"). Namely, threshold value SOC1 is set to a value which is considerably close to target charging value SOCtag. Therefore, in the case where "the SOC is larger than threshold value SOC1", this SOC has already been considerably close to target charging value SOCtag, and the start of and the precision in a process of determining whether to end charging, which is described later herein, are required.

When the SOC is larger than threshold value SOC1, determination unit 410 uses the above-described Vb-SOC map to further calculate the SOC corresponding to the detected value of voltage Vb, and determines whether the calculated SOC is equal to or larger than target charging value SOCtag. This determination is a process of deter mining whether the SOC has reached target charging value SOCtag or not, namely whether to end external charging or not. In the present embodiment, this process of determination is referred to as "a process of determining whether to end charging". While target charging value SOCtag may be set to 100 percent (the SOC of power storage device 70 in the fully charged state), it is desirable to set the target charging value to a slightly lower value (a value of approximately 80 percent for example) than 100 percent, in order to prevent deterioration of power storage device 70.

Charging control unit 420 performs external charging when charging request flag F is in the ON state. At this time, charging control unit 420 switches the charging circuit and the charging mode depending on whether the SOC is larger than threshold value SOC1 or not.

When the SOC is smaller than threshold value SOC1, charging control unit 420 forms the single-stage charging circuit (see FIG. 3) to perform the single-stage charging.

Specifically, charging control unit 420 generates control signals S1 to 55 for setting switch units 350, 360, 370, 380, 390 each in the first state to output the generated control signals to switch units 350, 360, 370, 380, 390, respectively, and also generates a control signal SQ1 for stopping switching elements Q1, Q2 of conversion unit 310 in the OFF state to output the generated control signal to conversion unit 310. In this way, the single-stage charging circuit is formed. Then, charging control unit 420 generates a control signal SQ2 for causing switching elements Q3 to Q6 of conversion unit 320 to perform the switching operation, and outputs the generated control signal to conversion unit 320. Thus, the single-stage charging is carried out.

In contrast, when the SOC is larger than threshold value SOC1, charging control unit 420 forms the dual-stage charging circuit (see FIG. 4) to perform the dual-stage charging.

Specifically, charging control unit 420 generates control signals S1 to S5 for setting switch units 350, 360, 370, 380, 390 each in the second state, and outputs the generated control signals to switch units 350, 360, 370, 380, 390, respectively. In this way, the dual-stage charging circuit is formed. Then, charging control unit 420 generates control signal SQ1 for causing switching elements Q1, Q2 of conversion unit 310 to perform the switching operation to output the generated control signal to conversion unit 310, and also generates control signal SQ2 for causing switching elements Q3 to Q6 of conversion unit 320 to perform the switching operation to output the generated control signal to conversion unit 320. Thus, the dual-stage charging is performed.

Figure 6:
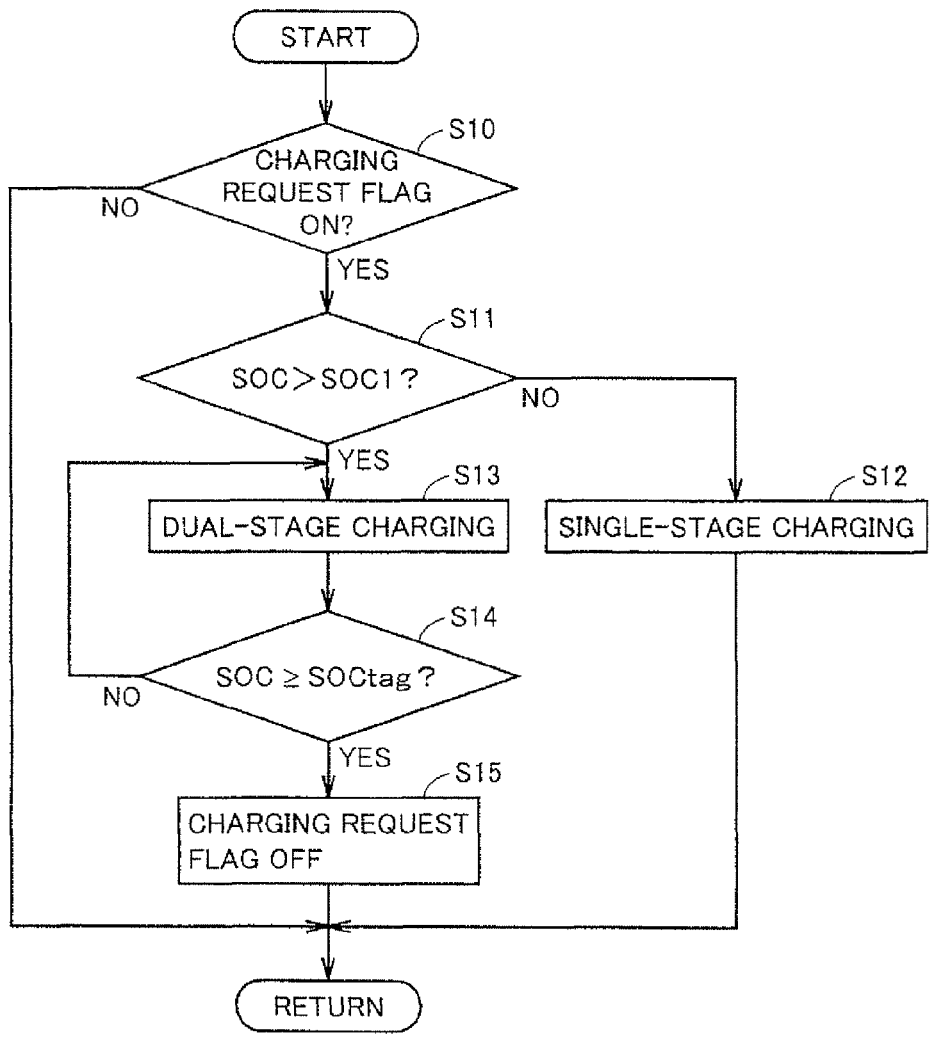
FIG. 6 is a diagram showing a process flow of the ECU.

FIG. 6 is a diagram showing a process flow of ECU 400 when the above-described functions are to be implemented.

In S10, ECU 400 determines whether charging request flag F is the ON state or not. When charging request flag F is the ON state (YES in S10), the process proceeds to S11. Otherwise (NO in S10), the process is terminated.

In S11, ECU 400 calculates the SOC based on the detected value of voltage Vb, and determines whether the calculated SOC is larger than threshold value SOC1 or not.

When the SOC is smaller than threshold value SOC1 (NO in S11), ECU 400 proceeds to S12 and forms the single-stage charging circuit to perform the single-stage charging.

In contrast, when the SOC is larger than threshold value SOC1 (YES in S11), ECU 400 proceeds to S13 and forms the dual-stage charging circuit to perform the dual-stage charging.

In S14, ECU 400 performs a process of determining whether to end charging. Specifically, ECU 400 calculates the SOC based on the detected value of voltage Vb, and determines whether the calculated SOC is equal to or larger than target charging value SOCtag.

When the SOC is smaller than target charging value SOCtag (NO in S14), ECU 400 returns to S13 to continue the dual-stage charging.

In contrast, when the SOC is equal to or larger than target charging value SOCtag (YES in S14), ECU 400 proceeds to S15 and switches charging request flag F from the ON state to the OFF state. In this way, the external charging is ended.

Figure 7:
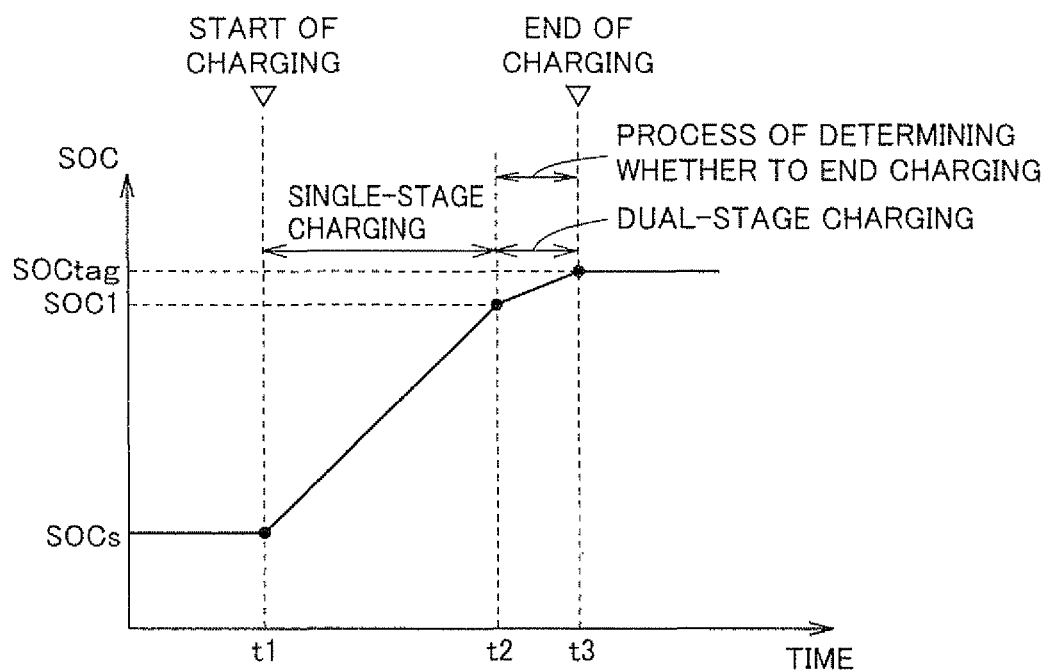
FIG. 7 is a diagram showing changes with time of the SOC and the charging mode in the case where external charging is performed.

FIG. 7 is a diagram showing changes with time of the SOC and the charging mode when external charging is performed.

At time t1, the external charging is started. The SOCs at the start of charging is smaller than threshold value SOC1, and thus the single-stage charging is performed. As described above, the single-stage charging is smaller in loss in switching operation and higher in charging efficiency than the dual-stage charging. In view of this, until time t2 at which the SOC exceeds threshold value SOC1, external charging is performed at a high charging efficiency, and accordingly at a high charging rate (the rate of increase in SOC). In particular, because threshold value SOC1 is set to a value considerably close to target charging value SOCtag, the single-stage charging by which high-efficiency and high-speed charging can be performed is carried out in most of the external charging.

After this, at time t2, the SOC exceeds threshold value SOC1. Since the SOC at this time has already become fairly close to target charging value SOCtag, a process of determining whether to end charging is started. At this time, the charging mode is switched from the single-stage charging to the dual-stage charging in order to enhance the precision in the process of determining whether to end charging. As described above, in the case of the dual-stage charging, as compared with the single-stage charging, the extent of variation of voltage Vb is smaller because of the presence of capacitor C1. The precision in calculating the SOC based on voltage Vb is thus improved, and consequently the precision in the process of determining whether to end charging (the precision in determining whether the actual SOC has become equal to or larger than target charging value SOCtag or not) is also improved.

At time t3, it is determined with precision that the SOC has reached target charging value SOCtag, by the process of determining whether to end charging, which is done during the dual-stage charging, and the external charging is ended. Therefore, continuation of the external charging (overcharging of power storage device 70) despite that the SOC has become equal to or larger than target charging value SOCtag, can appropriately be suppressed.

As seen from the foregoing, the present embodiment provides the circuit configuration that enables charger 300 to switch between the single-stage charging and the dual-stage charging, causes the single-stage charging of a high charging efficiency to be performed until the SOC exceeds threshold value SOC1 which is close to target charging value SOCtag, and switches the single-stage charging to the dual-stage charging of a high precision in determining whether to end charging, when the SOC exceeds SOC1 Consequently, improvement in charging efficiency as well as improvement in precision in the process of determining whether to end charging can be accomplished.

It should be construed that the embodiments disclosed herein are by way of illustration in all respects, not by way of limitation. It is intended that the scope of the present invention is defined by claims, not by the above description of the embodiments, and encompasses all modifications and variations equivalent in meaning and scope to the claims.

DESCRIPTION OF THE REFERENCE SIGNS 1 vehicle; 10 engine; 20 first MG; 30 second. MG; 40 power split device; 50 reducer; 60 motor drive device; 70 power storage device; 71 current sensor; 72 voltage sensor; 80 drive wheel; 110 charging port; 200 connector; 210 external power supply; 300 charger; 310, 320, 340 conversion unit; 330 insulated transformer; 350, 360, 370, 380, 390 switch unit; 400 ECU; 410 determination unit; 420 charging control unit; C1, C2, C3 capacitor; D1-D3 diode; L1-L4 reactor; NL1, NL2 negative line; PL1, PL2 positive line; Q1-Q6 switching element; R1, RE relay; SW1-SW5 switch

The invention claimed is:

1. A charging device for a power storage device mounted on a vehicle, comprising:
   a power receiving unit receiving electric power supplied from a power supply which is external to the vehicle; and
   a charger converting electric power which is input from said power receiving unit and outputting the converted electric power to said power storage device,
   said charger comprising:
   a first conversion unit including a first switching circuit having a plurality of switching elements;
   a second conversion unit connected to said first conversion unit and including a second switching circuit; and
   a switch unit for switching a circuit configuration of said charger to one of a first charging circuit for performing first charging by operating said second switching circuit without operating said first switching circuit, and a second charging circuit for performing second charging by operating both said first switching circuit and said second switching circuit,
   said charging device further comprises a control device controlling said charger, and
   said control device switches the circuit configuration of said charger to one of said first charging circuit and said second charging circuit, based on an amount of charge stored in said power storage device, wherein
   switching of the switching elements in the first switching circuit is stopped when the first charging is performed, and the switching elements in the first switching circuit are in a switching mode when the second charging is performed,
   said charger includes a positive line and a negative line for supplying electric power converted by said first conversion unit to said second conversion unit,
   said switch unit includes:
      a capacitor switch unit switched to a state of connecting a capacitor between said positive line and said negative line when said second charging circuit is formed, and switched to a state of disconnecting said capacitor between said positive line and said negative line when said first charging circuit is formed;
      a first reactor switch unit switched to a state of connecting a first reactor circuit between said power receiving unit and said first conversion unit when said second charging circuit is formed, and switched to a state of disconnecting said first reactor circuit between said power receiving unit and said first conversion unit when said first charging circuit is formed; and
      a second reactor switch unit switched to a state of connecting a second reactor circuit between said first conversion unit and said second conversion unit when said first charging circuit is formed, and switched to a state of disconnecting said second reactor circuit between said first conversion unit and said second conversion unit when said second charging circuit is formed.

2. The charging device for a power storage device according to claim 1, wherein
   when said amount of charge is smaller than a threshold value, said control device controls said switch unit so that said first charging circuit is formed, and controls said first switching circuit and said second switching circuit so that said first charging is performed, and
   when said amount of charge is larger than said threshold value, said control device controls said switch unit so that said second charging circuit is formed, and controls said first switching circuit and said second switching circuit so that said second charging is performed.

3. The charging device for a power storage device according to claim 2, wherein
   said threshold value is set to a value smaller by a predetermined value than a target value of said amount of charge when charging is performed.

4. The charging device for a power storage device according to claim 3, wherein
said control device calculates said amount of charge based on a voltage across said power storage device during said second charging, and determines whether said calculated amount of charge has reached said target value.

5. A charging method for a power storage device mounted on a vehicle,
said vehicle comprising:
a power receiving unit receiving electric power supplied from a power supply which is external to the vehicle; and
a charger converting electric power which is input from said power receiving unit and outputting the converted electric power to said power storage device,
said charger comprising:
a first conversion unit including a first switching circuit having a plurality of switching elements;
a second conversion unit connected to said first conversion unit and including a second switching circuit;
a switch unit for switching a circuit configuration of said charger to one of a first charging circuit for performing first charging by operating said second switching circuit without operating said first switching circuit, and a second charging circuit for performing second charging by operating both said first switching circuit and said second switching circuit; and
a positive line and a negative line for supplying electric power converted by said first conversion unit to said second conversion unit,
said switch unit includes:
a capacitor switch unit;
a first reactor switch unit; and
a second reactor switch, and
said charging method comprising the steps of:
determining whether to start external charging which charges said power storage device with electric power of said power supply; and
controlling said charger in a case of starting said external charging,
said step of controlling said charger including the step of switching the circuit configuration of said charger to one of said first charging circuit and said second charging circuit, based on an amount of charge stored in said power storage device, wherein
switching of the switching elements in the first switching circuit is stopped when the first charging is performed, and the switching elements in the first switching circuit are in a switching mode when the second charging is performed,
using the capacitor switch unit, switching to a state of connecting a capacitor between said positive line and said negative line when said second charging circuit is formed, and switching to a state of disconnecting said capacitor between said positive line and said negative line when said first charging circuit is formed,
using the first reactor switch, switching to a state of connecting a first reactor circuit between said power receiving unit and said first conversion unit when said second charging circuit is formed, and switching to a state of disconnecting said first reactor circuit between said power receiving unit and said first conversion unit when said first charging circuit is formed, and
using the second reactor switch unit, switching to a state of connecting a second reactor circuit between said first conversion unit and said second conversion unit when said first charging circuit is formed, and switching to a state of disconnecting said second reactor circuit between said first conversion unit and said second conversion unit when said second charging circuit is formed.

6. The charging method for a power storage device according to claim 5, wherein
said step of controlling said charger includes the steps of:
when said amount of charge is smaller than a threshold value, controlling said switch unit so that said first charging circuit is formed, and controlling said first switching circuit and said second switching circuit so that said first charging is performed; and
when said amount of charge is larger than said threshold value, controlling said switch unit so that said second charging circuit is formed, and controlling said first switching circuit and said second switching circuit so that said second charging is performed.

7. The charging method for a power storage device according to claim 6, wherein
said threshold value is set to a value smaller by a predetermined value than a target value of said amount of charge when charging is performed.

8. The charging method for a power storage device according to claim 7, wherein
said charging method further comprises the step of calculating said amount of charge based on a voltage across said power storage device during said second charging, and determining whether said calculated amount of charge has reached said target value.

* * * * *